United States Patent
Anderson et al.

(10) Patent No.: US 9,953,412 B1
(45) Date of Patent: Apr. 24, 2018

(54) SYSTEM AND METHODOLOGY TO PREVENT FALSE CLAIMS TO DELIVERED OR RENTED GOODS

(71) Applicant: INTERNATIONAL BUSINESS MACHINES CORPORATION, Armonk, NY (US)

(72) Inventors: Evelyn R. Anderson, Houston, TX (US); Michael Bender, New York, NY (US); Rhonda L. Childress, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/331,123

(22) Filed: Oct. 21, 2016

(51) Int. Cl.
| | |
|---|---|
| *G06K 9/68* | (2006.01) |
| *G06T 7/00* | (2017.01) |
| *G06K 9/62* | (2006.01) |
| *H04N 7/18* | (2006.01) |
| *G06F 17/30* | (2006.01) |
| *G06Q 40/08* | (2012.01) |

(52) U.S. Cl.
CPC ........ *G06T 7/001* (2013.01); *G06F 17/30247* (2013.01); *G06K 9/6202* (2013.01); *G06K 9/627* (2013.01); *G06Q 40/08* (2013.01); *H04N 7/181* (2013.01); *G06T 2207/10004* (2013.01); *G06T 2207/10012* (2013.01); *G06T 2207/10116* (2013.01)

(58) Field of Classification Search
None
See application file for complete search history.

(56) References Cited

U.S. PATENT DOCUMENTS

| | | | |
|---|---|---|---|
| 9,406,330 B1 * | 8/2016 | Kong | ............... G11B 5/84 |
| 2014/0270467 A1 | 9/2014 | Blemel et al. | |
| 2016/0335727 A1 * | 11/2016 | Jimenez | ......... G06Q 30/0185 |

FOREIGN PATENT DOCUMENTS

| | | |
|---|---|---|
| WO | 2007012222 | 11/2007 |
| WO | 2011017241 | 2/2011 |

OTHER PUBLICATIONS

Learning to compare image patches via convolutional neural networks, by Zagoruyko et al., Apr. 14, 2015.*
BVRLA; Fair Wear and Tear guides; Retrieved from the Internet Jun. 23, 2016; URL: http://www.bvrla.co.uk.service/fair-wear-and-tear-guides; 2 pages.

* cited by examiner

*Primary Examiner* — Vikkram Bali
(74) *Attorney, Agent, or Firm* — Schmeiser, Olsen & Watts; John R. Pivnichny

(57) ABSTRACT

A method and system of assessing damage to an object. A first digital image of an object is taken at a first point in time with a first camera. A second digital image of the object is taken at a second point in time with a second camera, where the second point in time is after the first point in time. The first digital image and the second digital image may are compared to determine if there is damage to the object. In response to a determination that there is damage to the object, a potential source of the damage to the object is determined by analyzing historical trends of damage to historically damaged objects.

19 Claims, 12 Drawing Sheets

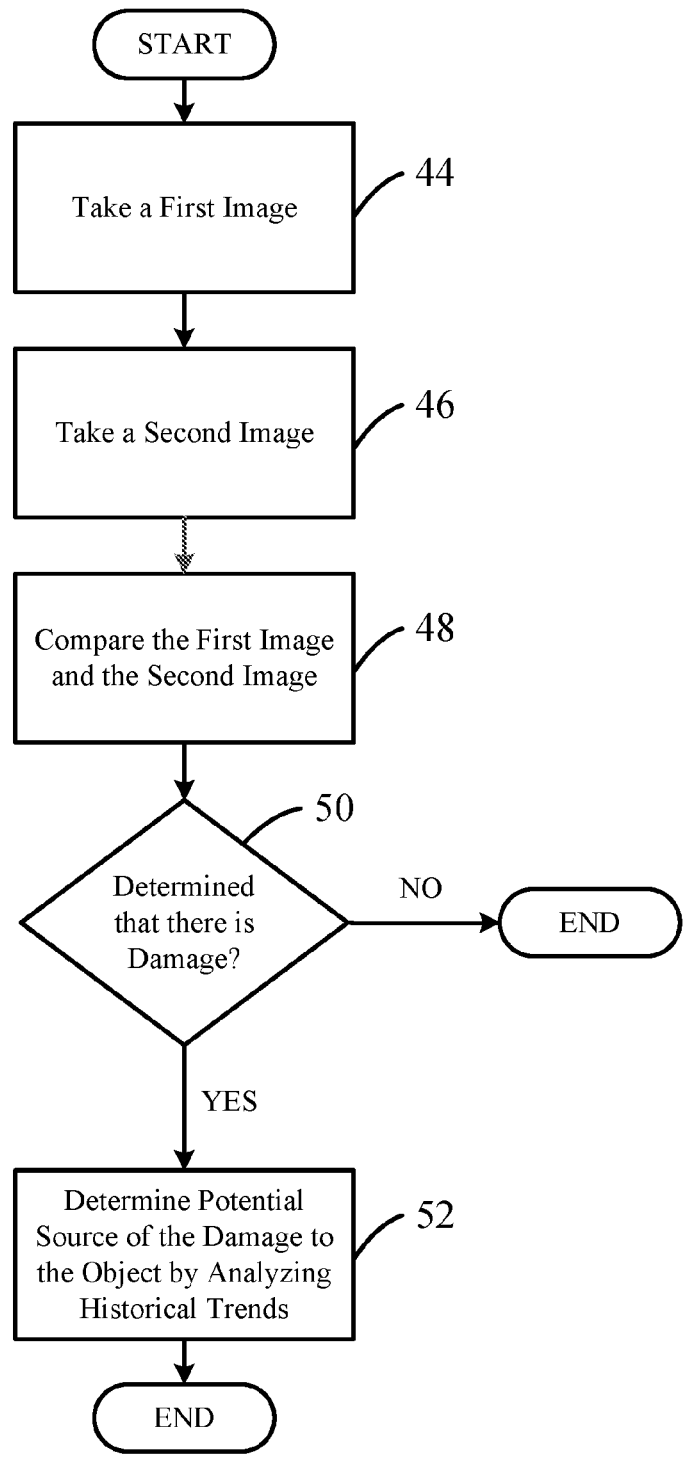

SYSTEM AND METHODOLOGY TO PREVENT FALSE CLAIMS TO DELIVERED OR RENTED GOODS

TECHNICAL FIELD

The present invention relates to assessing damage to an object that is in possession of a third party.

BACKGROUND

When objects of value are in the possession of third parties, there is a risk that those objects will be damaged. For example, when an airline customer has checked their luggage in with an airline, they may receive their luggage at the conclusion of their trip and notice damage. An airline customer with damaged luggage may complain to the airline and demand compensation. In many instances, the damage to the luggage is pre-existing, which would not be the responsibility of the airline. In other instances, the damage to the luggage is associated with normal wear and tear, which also would not be the responsibility of the airline. Of course, it is also possible that the airline mishandled their customer's luggage and that the airline should compensate the customer for the damage.

When a customer demands compensation for damaged luggage which is not the fault of the airline, the customer's demands may be regarded as a false claim. False claims may be honest misunderstandings by customers about the pre-existing condition of their luggage. However, false claims may be customers trying to fraudulently receive compensation from an airline. It may be pragmatically difficult for airlines, to argue with customers about false claims without adequate evidence, since that may result in reduced customer loyalty. At the same time, it is important for airlines to avoid having to pay compensation for damage that which was not their fault. Additionally, if damage to luggage is due to the fault of the airline, then it is in the airline's interest to determine the source of the damage in order to prevent future damage to other customer's luggage.

These complications in assessing damage to objects in the possession of third parties is not limited to airlines. Similar challenges can be found with package delivery services, rental car companies, equipment rental companies, apparel rentals, dry cleaners, and any other circumstance where objects are the possession of third parties and are open to dispute when damage occurs.

SUMMARY

Embodiments of the present invention relate to a method, and associated computer system and computer program product of assessing damage to an object. A first digital image of the object is taken at a first point in time with a first camera. A second digital image of the object is taken at a second point in time with a second camera, where the second point in time is after the first point in time. The first digital image and the second digital image is compared to determine if there is damage to the object. In response to a determination that there is damage to the object, a potential source of the damage to the object is determined by analyzing historical trends of damage to historically damaged objects.

BRIEF DESCRIPTION OF THE DRAWINGS

FIG. 2 is a process flow diagram of an example method of assessing damage to an object, in accordance with embodiments of the present invention.

DETAILED DESCRIPTION

FIGS. 1A through 1E illustrate example systems 10 of assessing damage to objects (e.g. luggage 24A-24B, packages 28A-28B, vehicles 32A-32B, tools 36A-36B, clothing 40A-40B), in accordance with embodiments of the present invention. One of ordinary skill in the art would appreciate that system 10 may assess damage to any other type of object aside from the example categories of objects illustrated in FIGS. 1A through 1E, in accordance with embodiments of the present invention. In embodiments, system 10 may assess damage to objects between a first point in time and a second point in time to help prevent and/or reconcile false claims of damaged objects.

Figure 1A:
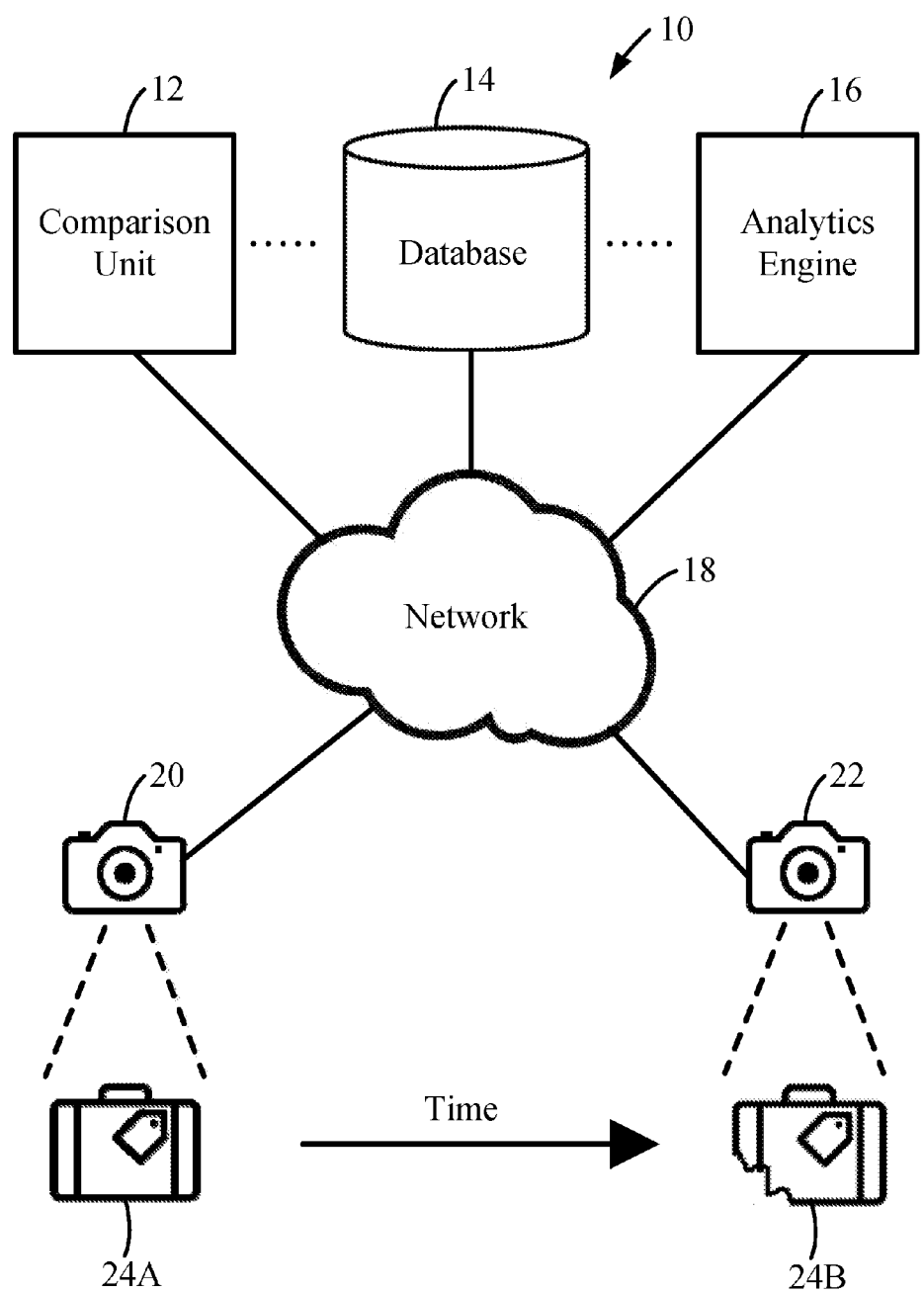
FIGS. 1A through 1E illustrate example systems of assessing damage to objects, in accordance with embodiments of the present invention.

FIG. 1A illustrates system 10 which may help prevent and/or reconcile false claims for luggage handled by a transportation carrier, in accordance with embodiments. System 10 may include first camera system 20, which may take one or more digital images of checked luggage 24A at a first point in time. System 10 may include second camera system 22 which may take one or more digital images of claimed luggage 24B at a second point in time. Checked luggage 24A is the same as claimed luggage 24B, but in different states of disrepair at a first point in time compared to a second point in time, which may be captured by first camera system 20 and second camera system 22, respectively. System 10 may be used to assess damage to claimed luggage 24B that occurred during handling of the checked luggage 24A as it was handled by the transportation carrier between the first point in time and the second point in time. For example, system 10 illustrated in FIG. 1A may be utilized by a transportation carriers such as airlines, railroads, bus services, cruise lines, or similar transportation services where customers check-in their checked luggage 24A at the beginning of their trip and claim their claimed luggage 24B at the end of their trip. In other embodiments, system 10 may be used for assessment of damage to claimed luggage 24B at intermediate points during a trip prior to a customer claiming their luggage, such as at an airline transfer point.

In embodiments, a transportation carrier may be an airline operator, a train operator, a boat operator, a bus operator, a motor coach operator, a bicycle operator, an automobile operator, a trucking operator, a shipping operator, a package handler, or any other transportation carrier as would be appreciated by one of ordinary skill in the art. Embodiments are not limited to the examples described in this patent application, as one of ordinary skill in the art would appreciate that embodiments would apply to any situation where an object is placed in the custody of a third party entity and there is a possibility of damage cause by the third party entity to that item while in their custody.

In the example of luggage, checked luggage 24A may be in its initial state of disrepair at the time of check-in to the transportation carrier at the beginning of a trip. Checked luggage 24A may have some preexisting damage at the first point in time when it is checked-in, which may be captured in one or more digital images taken by first camera system 20. Claimed luggage 24B may be damaged between the first point in time and the second point in time when it is in the custody of a transportation carrier. Damage to claimed luggage 24B, which may be the fault of the transportation carrier, may be captured in one or more digital images by second camera system 22.

In general, transportation carriers are responsible for damage that they caused to claimed luggage 24B that was neither pre-existing damage or due to normal wear and tear. However, transportation carriers may incur significant financial and/or customer loyalty losses due to false claims by customers that their luggage was damaged. In some circumstances, such false claims are innocent, due to a customer honestly believing that damage was caused to their claimed luggage 24B while it was in the possession of the transportation carrier. In other circumstances, such false claims are fraudulent, when a customer attempts to receive compensation from a transportation carrier for their damaged claimed luggage 24B, when such damage was actually known by the customer to be pre-existing damage or due to normal wear and tear.

Regardless of whether false claims to claimed luggage 24B are innocent or fraudulent, the ability of a transportation carrier to assess a potential source of damage to claimed luggage 24B is both desirable and financially beneficial. For example, if transportation carriers are able to document through images by first camera system 20 pre-existing damage to checked luggage, then the transportation carrier may be able to easily convince an innocent complaining customer that the pre-existing damage was not the fault of the transportation carrier. Being able to convince the innocent claiming customer that damage to their luggage was either pre-existing or due to normal wear and tear may be financially beneficial to the transportation carrier, as it will prevent the transportation carrier for having to unnecessarily compensate the complaining customer for damage to claimed luggage 24B, which should not be the liability of the transportation carrier.

Pragmatically, without the transportation carrier having evidence that the damage to claimed luggage 24B was pre-existing at the time of check-in, the transportation carrier may be compelled to compensate the customer for damage that was not the transportation carrier's fault in order to maintain customer loyalty for future transactions. Also, in general, transportation carriers are dependent on repeat customers and referrals, which often causes transportation carriers to compensate customers for pre-existing damage to their claimed luggage, even when the transportation carrier is not responsible for that pre-existing damage. For example, the risk that a transportation carrier loses a repeat customer or a dissatisfied customer complains about the transportation carrier to other potential customers may be greater than the cost of compensating dissatisfied customers for pre-existing damage to their luggage, even if such damage is not actually the liability of the transportation carrier.

Without adequate documentation of the state of disrepair of checked luggage 24A at the time of check-in, it may be difficult for the transportation carrier to assess whether the transportation carrier is responsible for damage to claimed luggage 24B, as the transportation carrier may not be able to readily establish whether damage to claimed luggage 24B is pre-existing damage or due to normal wear and tear. If in fact the transportation carrier is responsible for damage to claimed luggage 24B and should compensate a customer for this damage due to mishandling of luggage 24B while it was in the possession of the transportation carrier, it is desirable for the transportation carrier to identify the source of the damage. By identifying the source of the damage to luggage 24B, the transportation carrier may be able to make corrections to how the transportation carrier handles luggage in the future in order to avoid payment of claims to customers in the future and/or improve the overall customer satisfaction with the transportation carrier by avoiding preventable damage to luggage in the future. It is financially beneficial and otherwise desirable for transportation carriers to determine potential sources of damage to prevent future unnecessary damage to luggage for both direct financial reasons and customer loyalty reasons.

In embodiments, first camera system 20 or second camera system 22 may be a single camera or a system of multiple co-located cameras. In embodiments, first camera system 20 or second camera system 22 may include one or more digital cameras that take digital images, one or more three dimensional cameras that take three-dimensional images, one or more x-ray cameras that take internal images, and/or any other kind of image capturing system appreciated by those of ordinary skill in the art.

First camera system 20 and second camera system 22 may be coupled to a network 18, in accordance with embodiments. Network 18 may be any kind of communication network which allows for first camera system 20 and second camera system 22 to send and receive data to other devices. For example, network 18 may be the internet, a closed communication network, a local network, direct communication cables, a wireless network, or any other kind of network appreciated by those skilled in the art. Through network 18, first camera system 20 or second camera system 22 may communicate one or more images of checked luggage 24A to a comparison unit 12, a database 14, an analytics engine 16, and/or any other device which may be in communication with first camera system 20 and second camera system 22. One of ordinary skill in the art would appreciate that network 18 may be any means of communication which allows first camera system 20 and second camera system 22 to communicate.

In embodiments, comparison unit 12 may receive digital images from first camera system 20 and/or second camera system 22. In embodiments, comparison unit 12 may compare at least one first digital image taken by first camera system 20 at a first point in time with at least one second digital image taken by second camera system 22 at a second point in time to determine if damage is visible to claimed luggage 24B. Comparison unit 12 may be included in a computer system including one or more processors. Comparison unit 12 may be locally coupled to first camera system 20 and/or second camera system 22. Alternatively, comparison unit 12 may be remotely connected to the first camera system 20 and/or second camera system 22.

In embodiments, database 14 may store digital images taken by first camera system 20 and/or second camera system 22. In embodiments, database 14 may store digital images taken by other camera systems aside from first camera system 20 and/or second camera system 22. Database 14 may be coupled to network 18 to allow for direct or indirect communication with first camera system 20, second camera system 22, comparison unit 12, analytics engine 16, or any other device coupled to network 18. Database 14 may be integrated into a computer system including comparison unit 12 and/or analytics engine 16 or may be separately disposed.

In embodiments, analytics engine 16 may implement algorithms to determine, using one or more processors, one or more potential sources of damage to claimed luggage 24B. Analytics engine 16 may compare a digital image of checked luggage 24A taken by camera system 20 and a digital image of claimed luggage 24B with digital images of previously damaged luggage that has similar characteristics. In embodiments, analytics engine 16 may analyze historical trends of damage to historically damaged objects, for which images are stored in database 14. Analytics engine 16 may be coupled to network 18 to allow for direct or indirect communication with first camera system 20, second camera system 22, comparison unit 12, analytics engine 16, or any other device coupled to network 18. Analytics engine 16 may be integrated into a computer system including comparison unit 12 and/or database 14 or may be separately disposed.

In embodiments, analytics engine 16 may collect information related to circumstance of checked luggage 24A between a first point in time when first camera system 20 take at least one digital image of checked luggage 24A and a second point in time when second camera system 22 take at least one digital image of claimed luggage 24B. Information collected by analytics engine 16 may be a particular route that the claimed luggage 24B traveled, equipment handling the claimed luggage 24B, a type of claimed luggage 24B, size of claimed luggage 24B, weight of claimed luggage 24B, personnel handling claimed luggage 24B, a contractor of the transportation carrier, and/or any other circumstances that could be used to establish damage or a pattern of damage to claimed luggage 24B and/or historically damaged luggage.

In embodiments, analytics engine 16 may compare information related to circumstances of claimed luggage 24B between a first point in time when at least one digital image is captured by first camera system 20 and a second point in time when at least one digital image is captured by second camera system 22 with circumstances of historically damaged objects stored in database 14. For example, if claimed luggage 24B is determined to be damaged, analytics engine 16 may compare analyze historical trends that can be correlated to other damaged luggage, such as commonality of travel routes, types of baggage, personnel handing luggage, and/or any other relevant circumstances. For example, if analytics engine 16 identifies that many pieces of luggage are damaged when they travel through a particular airport, then the analytics engine may determine that there is a historical trend for that particular airport that needs attention. Such a historical trend identified by analytics engine 16 may be an indication that luggage processing equipment is malfunctioning at that airport and should be repaired to avoid costly damage to customers luggage. Such a historical trend identified by analytics engine 16 may be an indication that personnel at that airport or a particular contractor need to be retrained or the relationship terminated. In embodiments, analytics engine 16 may calculate the cost of damage to an item using historical trends identified.

Figure 1B:
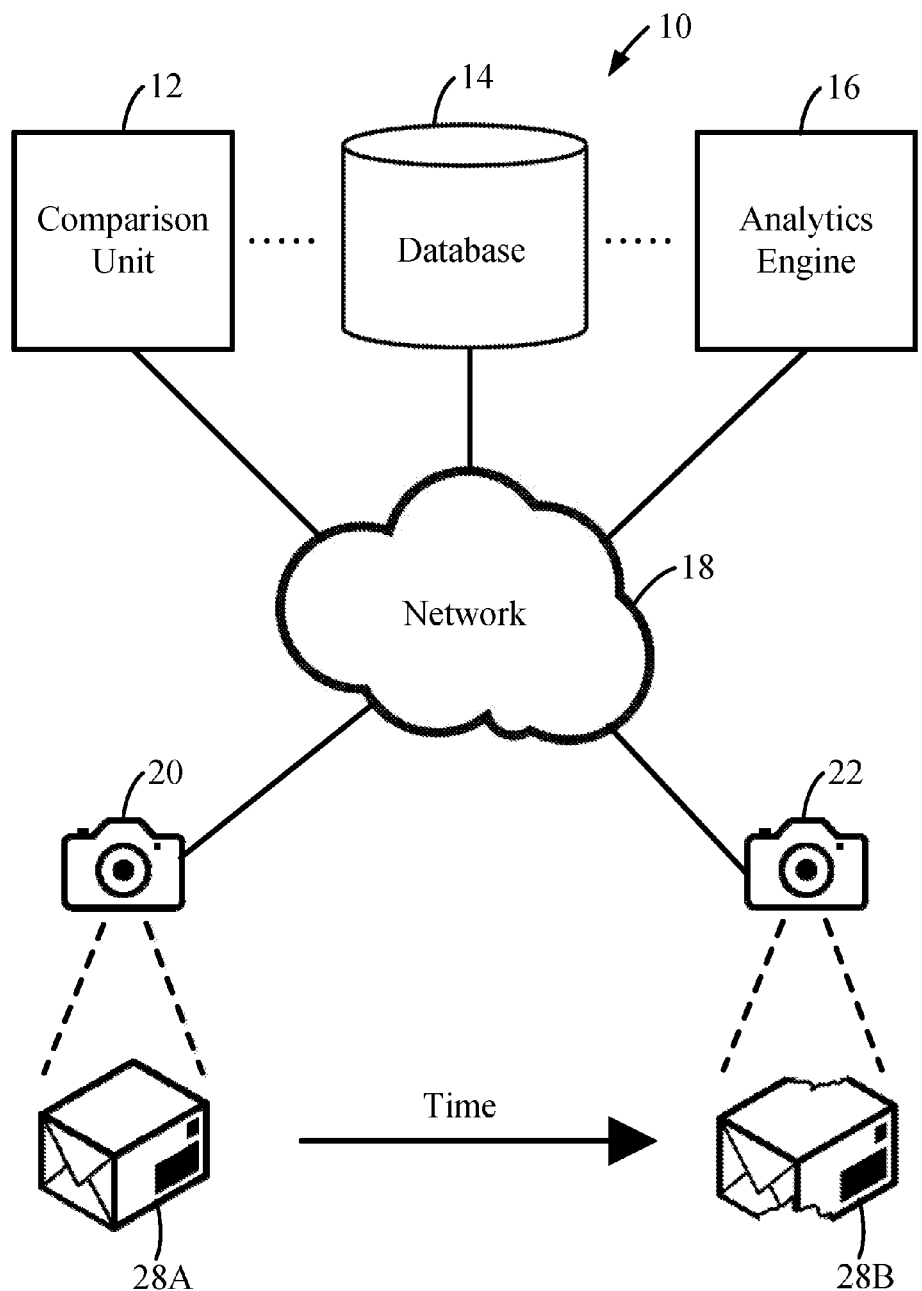

FIG. 1B illustrates system 10 which may prevent false claims for received package 28A and delivered package 28B handled by a shipping company, in accordance with embodiments. System 10 illustrated in FIG. 1B may include first camera system 20, second camera system 22, network 18, comparison unit 12, database 14, and analytics engine 16 with implementations that are specific to shipping companies. At least one digital image of received package 28A may be taken by first camera system 20 at a first point in time when received package 28A is given by a customer to a shipping company implementing system 10, in accordance with embodiments. At least one digital image of delivered package 28B may be taken by second camera system 22 at a second point in time when delivered package 28B is delivered to a customer, in accordance with embodiments. In embodiments, first camera system 20 and second camera system 22 may take digital images of received package 28A and/or delivered package 28B at any time between when a customer entrusts a shipping company with received package 28A and/or when a customer receives delivery of delivered package 28B from the shipping company. One of ordinary skill in the art would appreciate similarities and modifications between implementations of a shipping company and a transportation carrier without departing from the spirit and scope of the embodiments of the present invention.

Figure 1C:
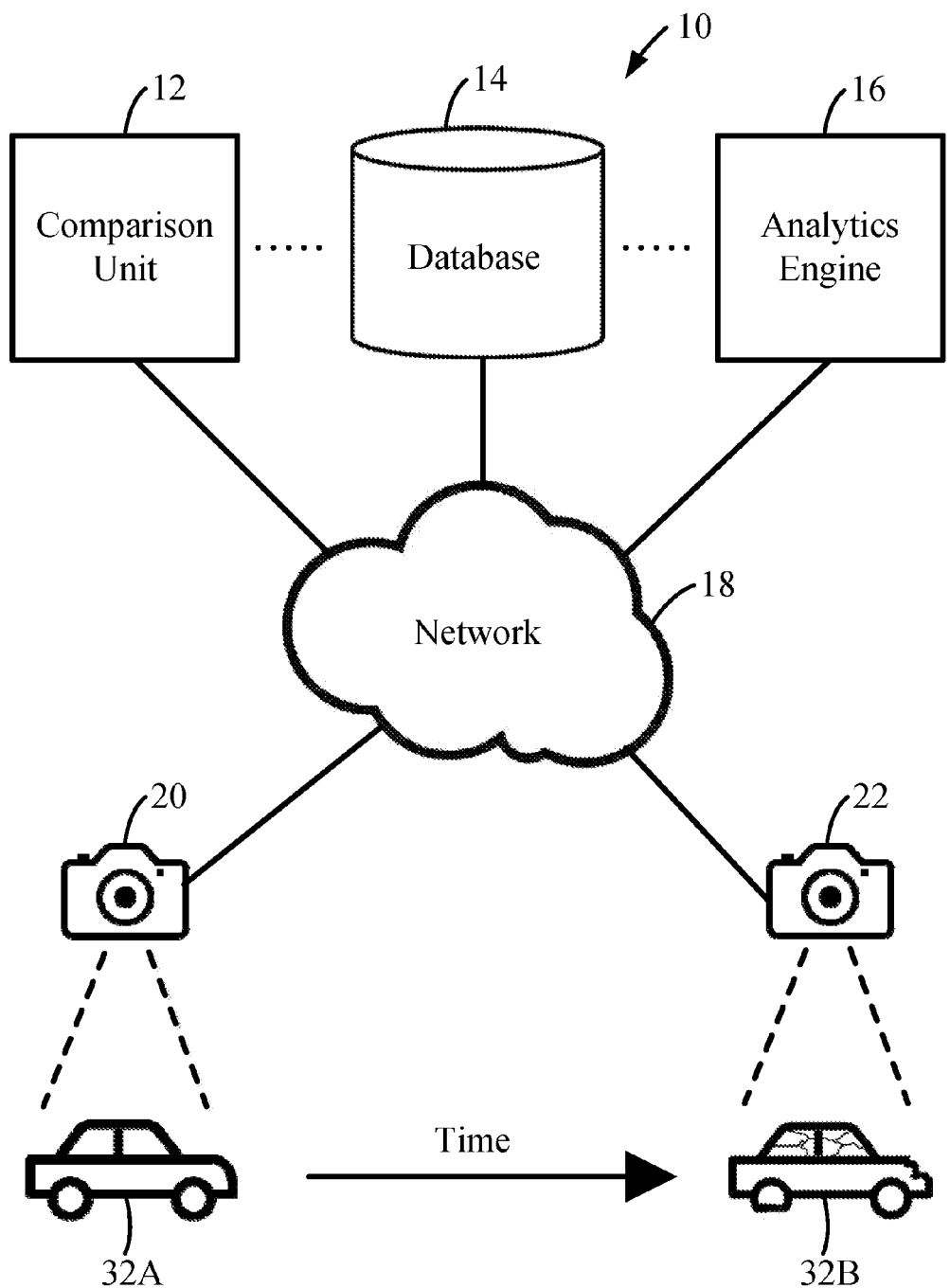

FIG. 1C illustrates system 10 which may prevent false claims for received vehicle 32A and delivered vehicle 32B handled by a third party taking possession of received vehicle 32A, in accordance with embodiments. System 10 illustrated in FIG. 1C may include first camera system 20, second camera system 22, network 18, comparison unit 12, database 14, and analytics engine 16 with implementations which are specific to vehicle possession situations. At least one digital image of received vehicle 32A may be taken by first camera system 20 at a first point in time when received vehicle 32A changes possession, in accordance with embodiments. At least one digital image of delivered vehicle 32B may be taken by second camera system 22 at a second point in time when delivered vehicle 32B changes possession a second time, in accordance with embodiments. In embodiments, first camera system 20 and second camera system 22 may take digital images of received vehicle 32A and/or delivered vehicle 32B at any time between when received vehicle 32A and/or delivered vehicle 32B changes possession.

In embodiments, a third party taking possession of received vehicle 32A may be a renter or lessee of a vehicle that they are renting from a vehicle renting/leasing company. At the time a renter or lessee rents or leases received vehicle 32A, first camera system 20 may take at least one digital image of received vehicle 32A. Upon return of delivered vehicle 32B to a vehicle renting/leasing company at the end of the rent or lease contract, second camera system 22 may take at least one digital image of delivered vehicle 32B.

In embodiments, system 10 may allow a vehicle renting/leasing company to assess damage to a delivered vehicle 32B, which may protect the renter/lessee from false claims from the renting/leasing company. Protection of the renter/lessee from false claims from the renting/leasing company may be beneficial to the renting/leasing company, since unnecessary disputes can be avoided which may adversely affect customer loyalty or otherwise decrease customer referrals. In other words, it may be desirable for a renting/leasing company to be able to smoothly resolve any damage disputes with their customers for customer relations purposes, which may significantly affect profitability of the renting/leasing company.

In embodiments, system 10 may allow a vehicle renting/leasing company from false claims and/or unidentified claims of damage to delivered vehicle 32B. For example, using system 10, a vehicle renting/leasing company may be able to assess damage to a rented vehicle which should be covered by the renter/lessee and/or their insurance companies. In embodiments, system 10 may be able to use historical records in database 14 to track down the source of any damage and have the ability to attribute that damage to a liable renter/lessee.

Using comparison unit 12, database 14, and/or analytics engine 16, a vehicle renting/leasing company may be able to establish historical trends in damage relating to the circumstances of a rented/leased vehicle in order to improve pricing and/or otherwise improve customer service. One of ordinary skill in the art would appreciate similarities and modifications between implementations of a renting/leasing company and a transportation carrier without departing from the spirit and scope of the embodiments of the present invention.

In embodiments, a third party taking possession of received vehicle 32A may be a service provider for an owner or principal user of received vehicle 32A. For example, an owner of received vehicle 32A may give temporary possession of a vehicle to a valet service, mechanic, or any other service that takes possession of received vehicle. At the time such a third party takes possession of received vehicle 32A, first camera system 20 may take digital images of the received vehicle 32A, in accordance with embodiments. Upon return of delivered vehicle 32B to the owner or authorized user picking up delivered vehicle 32B, second camera system 22 may take digital images of delivered vehicle 32B. Using comparison unit 12, database 14, and/or analytics engine 16, a service provider may be able to protect themselves against false claims, in accordance with embodiments. One of ordinary skill in the art would appreciate that embodiments would relate to any change in possession of a vehicle where the possibility of false claims could arise. One of ordinary skill in the art would appreciate similarities and modifications between implementations of a vehicle service provider and a transportation carrier without departing from the spirit and scope of the embodiments of the present invention.

Figure 1D:
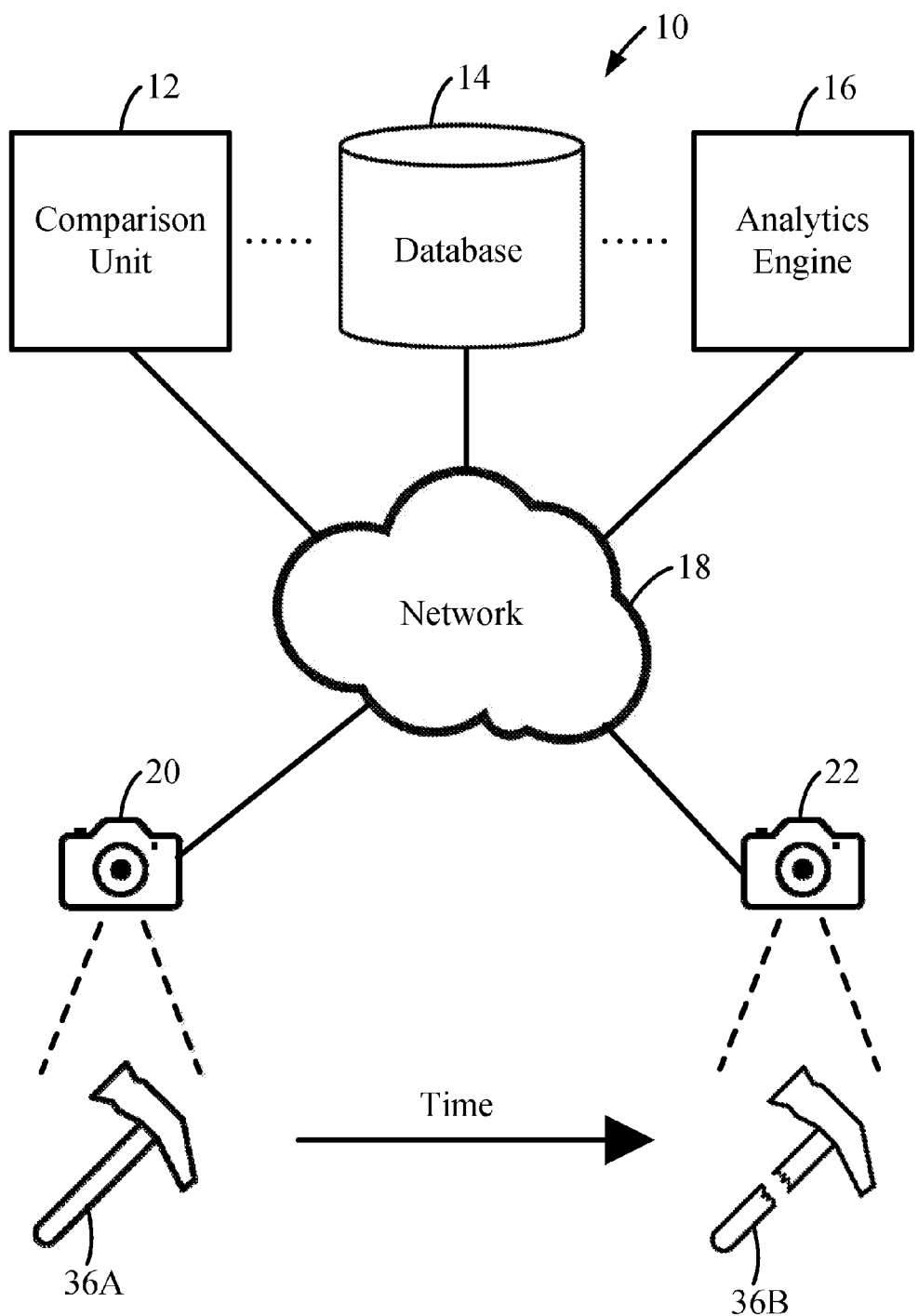

FIG. 1D illustrates system 10 which may prevent false claims for received tool 36A and delivered tool 36B handled by a third party taking possession of received tool 36A, in accordance with embodiments. System 10 illustrated in FIG. 1D may include first camera system 20, second camera system 22, network 18, comparison unit 12, database 14, and analytics engine 16 with implementations which are specific to equipment rental situations and/or other similar situations. For example, at least one digital image of received tool 36A may be taken by first camera system 20 at a first point in time when received tool 36A changes possession, in accordance with embodiments. At least one digital image of delivered tool 36B may be taken by second camera system 22 at a second point in time when delivered tool 36B changes possession a second time, in accordance with embodiments. In embodiments, first camera system 20 and second camera system 22 may take digital images of received tool 36A and/or delivered tool 36B at any time between when received tool 36A and/or delivered tool 36B changes possession. One of ordinary skill in the art would appreciate other transportable objects that may change possession and be involved in false claims, which would be covered by aspects of embodiments in substitute for received tool 36A and/or delivered tool 36B. In embodiments, a third party taking possession of received tool 36A may be a renter of received tool 36A, whereas a rental company uses system 10 to protect against false claims and maintain customer satisfaction. One of ordinary skill in the art would appreciate similarities and modifications between implementations of an equipment rental company and a transportation carrier without departing from the spirit and scope of the embodiments of the present invention.

Figure 1E:
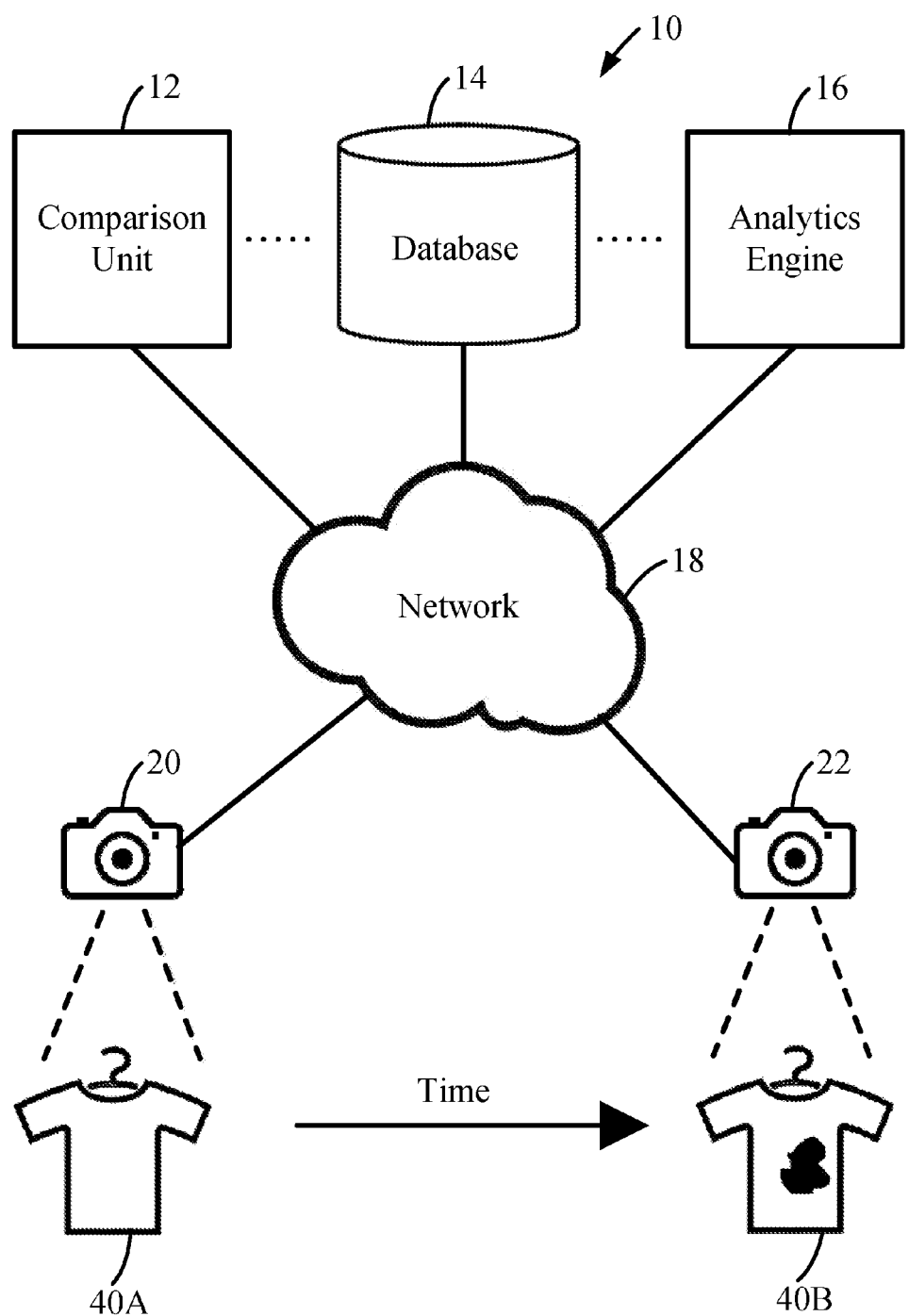

FIG. 1E illustrates system 10 which may prevent false claims for received clothing 40A and delivered clothing 40B handled by a third party taking possession of received clothing 40A, in accordance with embodiments. System 10 illustrated in FIG. 1E may include first camera system 20, second camera system 22, network 18, comparison unit 12, database 14 and analytics engine 16 with implementations which are specific to clothing possession situations by third parties or other similar situations. For example, at least one digital image of received clothing 40A may be taken by first camera system 20 at a first point in time when received clothing 40A changes possession, in accordance with embodiments. At least one digital image of delivered clothing 40B may be taken by second camera system 22 at a second point in time when delivered clothing 40B changes possession a second time, in accordance with embodiments. In embodiments, first camera system 20 and second camera system 22 may take digital images of received clothing 40A and/or delivered clothing 40B at any time between when received clothing 40A and/or delivered clothing 40B changes possession. One of ordinary skill in the art would appreciate other objects similar to clothing that may change possession and be involved in false claims, which would be covered by aspects of embodiments in substitute for received clothing 40A and/or delivered clothing 40B. In example embodiments, a third party taking possession of received clothing 40A may be a dry cleaner, whereas the dry cleaner uses system 10 to protect against false claims and maintain customer satisfaction. In other example embodiments, a third party taking possession of received clothing may be a purchaser or lessee of received clothing 40A, whereas the clothing retailer/lessor uses system 10 to protect against false claims upon the delivered clothing 40B being returned in order to maintain customer satisfaction. One of ordinary skill in the art would appreciate similarities and modifications between implementations of clothing companies and a transportation carrier without departing from the spirit and scope of the embodiments of the present invention.

FIG. 2 is a process flow diagram of an example method of assessing damage to an object, in accordance with embodiments of the present invention. In step 44, a first digital image is taken of an object at a first point in time with at least one first camera. In step 46, a second digital image is taken of the object at a second point in time with at least one second camera. In some embodiments, the at least one first camera and the at least one second camera are separate camera systems. In other embodiments, the at least one first camera and the at least one second camera are the same camera system. In step 48, the first digital image and the second digital image are compared to determine if there is damage to the object based on the comparison. In step 50, it is determined if there is damage to the object. In step 50, if it is determined that there is no damage to the object, then the process ends. In step 50, if it is determined that there is damage to the object, then the process continues to step 52. In step 52, at least one potential source of damage to the object is determined by analyzing historical trends of damage to historically damaged objects.

In embodiments, step 48 may compare the first digital image and the second digital image may use an image processing convolutional neural network. Convolutional neural networks may have multiple layers of receptive fields. These receptive fields are small neuron collections which process portions of the first digital image and the second digital image. The outputs of these collections may then be tiled so that their input regions overlap, which may result in an improved representation of the first digital image and the second digital image. Tiling may tolerate translations of the first digital image and the second digital image in order to determine similarities and differences between the first digital image and the second digital image.

Figure 3:
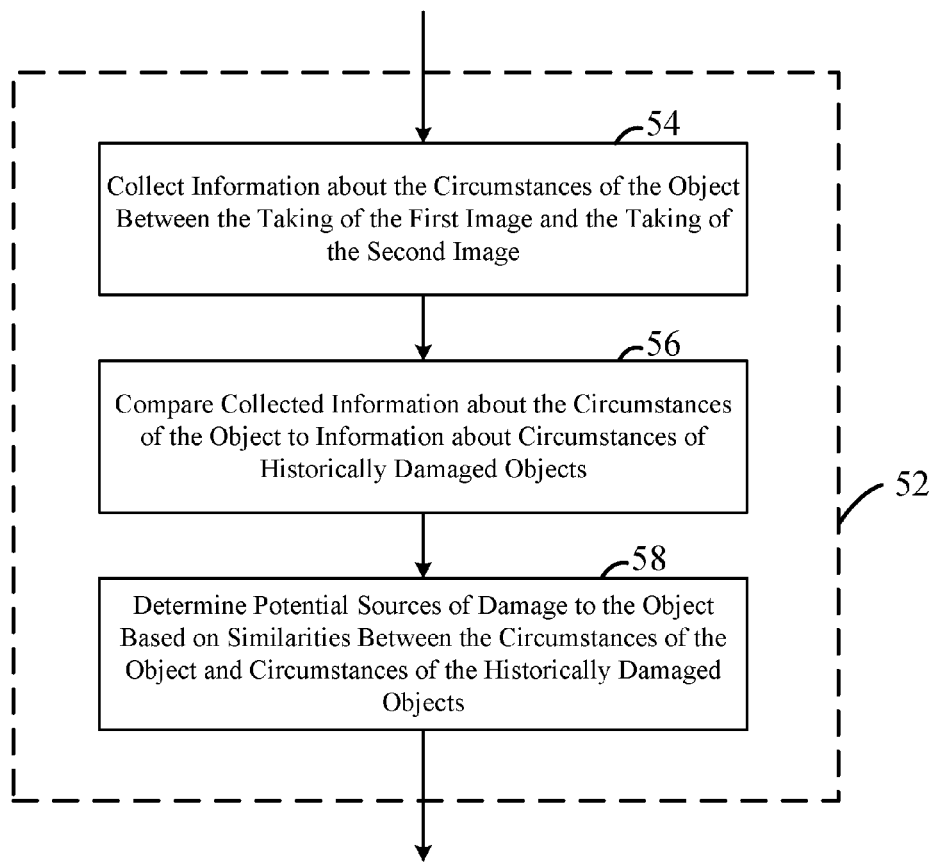
FIG. 3 is a process flow diagram of an example method of determining a potential source of damage to an object by analyzing historical trends, in accordance with embodiments of the present invention.

FIG. 3 is a process flow diagram of an example method of determining a potential source of damage to an object by analyzing historical trends, in accordance with embodiments of the present invention. In embodiments, step 52 of determining at least one potential source of damage to the object includes step 54 of collecting information about the circumstances of the object between the taking of the first digital image and the taking of the second digital image. Step 52 may also include step 56 that compares collected information about the circumstances of the object to information about the circumstances of historically damaged objects, in accordance with embodiments. Step 52 may further include step 58 that determines potential sources of damage to the object based on similarities between the circumstances of the object and circumstances of historically damaged objects.

In embodiments, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

In embodiments, the determining potential sources of damage may be implemented using special purpose algorithms. For example, a special purpose algorithm may be implemented to compare attributes of damage to the object and historically damaged objects. Similar damage between the object and historically damaged objects may identify patterns of the circumstances of the object and the historically damaged objects, which through the special purpose algorithm allow a potential source of damage based on industry specific circumstances. In embodiments, a special purpose algorithm analyzing scratches, tears, cracks, indentations, missing components, discoloration, travel paths, brands of objects, models of objects, personal handling objects, weight attributes of objects, circumstantial weather attributes of objects, utilities of objects, seasonal attributes of objects, and/or any other industry specific attributes that would be obvious to one of ordinary skill in the art.

For example, in embodiments illustrated in FIG. 1A, damage may have attributes of length, shape, curvature, color, or other characteristics that indicate that damage occurred from luggage processing equipment, damage occurred at a specific location, damage occurred on a particular travel route, damage occurred under the care of certain personnel, or damage occurred from common environmental circumstances such a rain. The special purpose algorithm may be specific to damage attributes that are specifically relevant to a particular type of transportation carrier.

For example, a particular type of discoloration of luggage may be an indication that luggage was damaged from weather, which may or may not be the liability of the transportation carrier. If the damage was due to extreme weather conditions, then the transportation carrier may not have liability. If the damage was due to normal rain, but the luggage was left unattended for a long period of time in the rain, then the transportation carrier may have liability. Yet another particular type of discoloration may indicate that luggage was damaged from being dropped from a height and liquid contents in the luggage broke, which may look distinguishably different than discoloration due to weather. Regardless of the source of the discoloration, a special purpose algorithm may be specific to discoloration of luggage.

As another example in relation to example embodiments illustrated in FIG. 1A, a particular type of tear on luggage may be an indication that a piece of luggage handling equipment (e.g. a conveyer belt) was not operating properly. Not only would the transportation carrier desire to determine that the source of the damage is from broken equipment, but the transportation carrier would want to identify the location of the improperly operating luggage handling equipment, using a special purpose algorithm that identifies both the commonality of tears in luggage between the luggage and historically damaged luggage, but also the circumstances of the luggage and historically damaged luggage, such as commonalities of the routes that the luggage traveled. One of ordinary skill in the art would appreciate that special purpose algorithms could determine other types of potential sources of damage specific to a transportation carrier industry or other similar industries.

For example, in embodiments illustrated in example FIG. 1B, a special purpose algorithm for parcel delivery companies may be specific to indentations to a package. Specific types of indentations may be an indication of packages being mishandled by machinery or personnel at specific transfer points. Not only may a special purpose algorithm be able to identify the potential cause of damage to a parcel, but by comparison with other historically damaged parcels, may be able to pinpoint the location of such mishandling, so that the mishandling may be corrected. One of ordinary skill in the art would appreciated other special purpose algorithms that could determine potential sources of damage specific to parcel delivery services or other similar industries.

For example, in embodiments illustrated in example FIG. 1C, a special purpose algorithm for rental car companies may be specific to damage to rented vehicles. Certain types of damage may be normal wear and tear based on the length or location of a scratch. Other types of damage may be due to accidents that are the fault of the renter. Some indentations may be the result of hail storms, which could be cross referenced with weather reports or similar damage to rented vehicles subjected to the hail storms. Special purpose algorithms to the circumstances of a rented car may be implemented in order to identify sources of damage in a car rental industry. One of ordinary kill in the art would appreciate other special purpose algorithms that could determine potential sources of damage specific to vehicles or other similar industries.

For example, in embodiments illustrated in FIG. 1D, a special purpose algorithm for tools may be specific to the rental of tools. Certain types of damage may be normal wear and tear due to the correct operation of a rented tool, while other types of damage may be indications of misuse of a rented tool or appliance. For example, tarnishing of paint on a chainsaw may be an indication of normal wear and tear, while missing components of a tool may be an indication that the tool was damaged at the liability of the person renting the tools. The length of time the tool was rented, profile of the person renting the tool, or the purpose of the renting of the tool may also be factors considered by a special purpose algorithm. A tool is just one example of an object that may be rented. One of ordinary skill in the art would appreciate other special purpose algorithms that could determine potential sources of damage specific to rented objects or similar industries.

For example, in embodiments illustrated in FIG. 1E, a special purpose algorithm may be implemented for rented clothing for special events. Certain types of damage may be normal wear and tear, such as minor coffee stains or fraying, while other types of damage may be indications of abuse of the rented clothing such a major tears or deep stains. The type of clothing to be rented, the season when the clothing was rented, the length of time the clothing was rented, or the profile of the person renting the clothing may also be factors considered by a special purpose algorithm. For example, different special purpose algorithms may be applied for a rented ski jacket to be used in sports than for a wedding dress rented for a marriage ceremony. Clothing rental is just one example of a particular industry to which a special purpose algorithm may be applied for clothing. Another example may be dry cleaning stores. One of ordinary skill in the art would appreciate other special purpose algorithms that could determine potential sources of damage specific to clothing.

Figure 4:
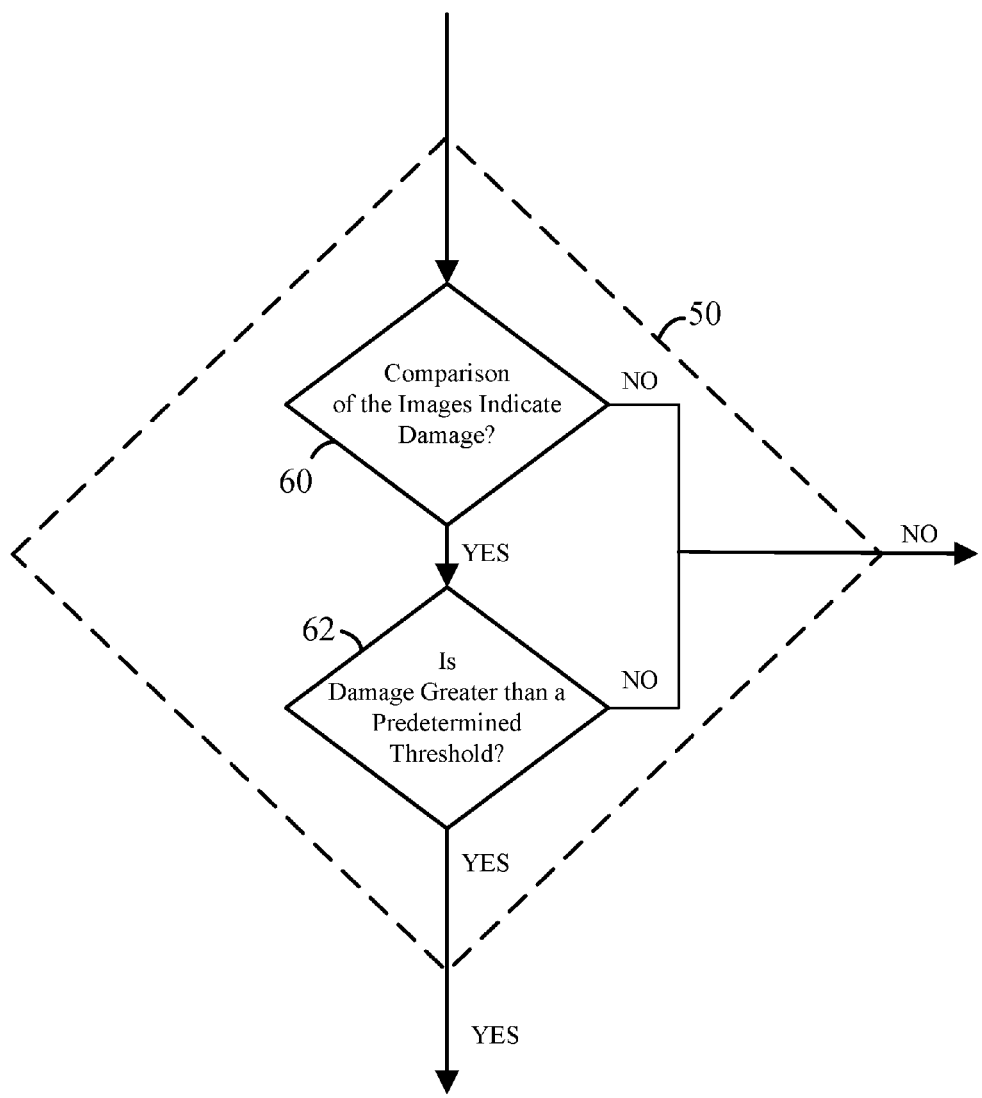
FIG. 4 is a process flow diagram of an example method of determining if there is damage to an object, in accordance with embodiments of the present invention.

FIG. 4 is a process flow diagram of an example method of determining if there is damage to an object, in accordance with embodiments of the present invention. In embodiments, step 50 that determines if there is damage to the object includes step 60 which decides if the comparison of the digital images indicates damage to the object. If step 60 decides that from the comparison of the images there is no damage to the object, then the process ends as shown in FIG. 2. If step 60 decides that there is damage to the object based on the comparison of the digital images, then the process continues to decision step 62. Step 62 decides if the damage to the object is greater than a predetermined threshold. If step 62 decides that the damage to the object is less than a predetermined threshold, then the process ends as shown in FIG. 2. If step 62 decides that the damage to the object is greater than a predetermined threshold, then the process continues to step 52 as shown in FIG. 2.

In embodiments, a predetermined threshold used in step 62 relates to standards of normal wear and tear. In various industries, there are standards that can be used as indications of normal wear and tear. For example, in the automobile industry in Great Britain, there is the British Vehicle Rental and Leasing Association (BVRLA), which publishes standards for normal wear and tear for rented and leased vehicles. Other standards may be used for rented and leased vehicles or other implementations of embodiments of the present invention, which allow for normal wear and tear to be distinguishable from liability damages. In step 62 of FIG. 4, if it is determined that damage from a comparison of two digital images is less than a predetermined threshold for the applicable industry, then the process will end without determining the potential source of the damage, since such damage is relatively negligible for the purposes of embodiments. Relevant standards may be set for checked luggage 24A illustrated in FIG. 1A, received package 28A illustrated in FIG. 1B, received vehicle 32A illustrated in FIG. 1C, received tool 36A illustrated in FIG. 1D, received clothing 40A illustrated in FIG. 1E, and/or any other object that may be assessed for damage in accordance with embodiments.

Figure 5:
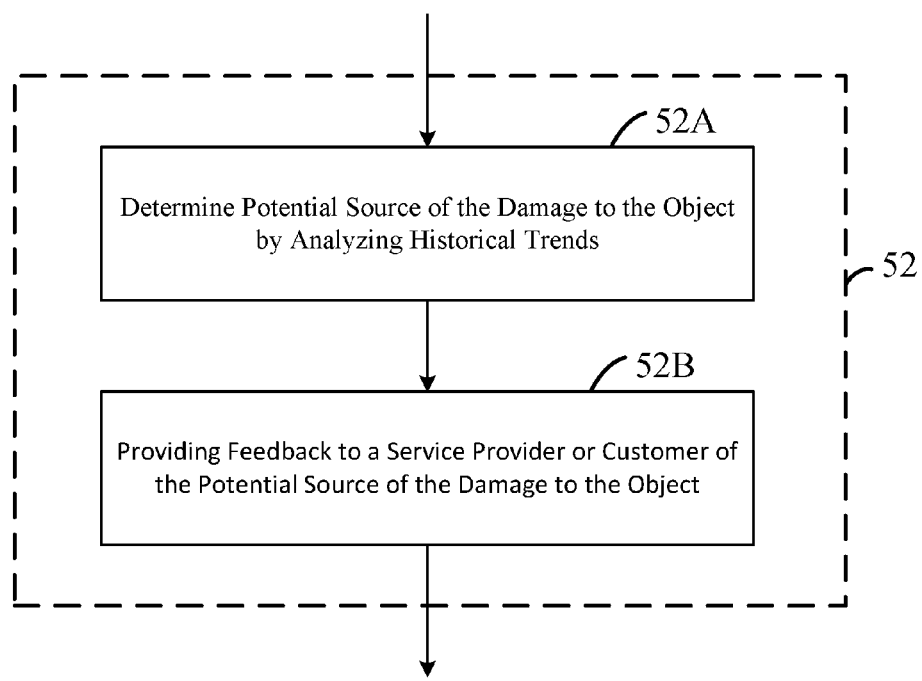
FIG. 5 is a process flow diagram of an example method that provides feedback to a service provider or customer of a potential source of damage to an object, in accordance with embodiments of the present invention.

FIG. 5 is a process flow diagram of an example method that provides feedback to a service provider or customer of the potential source of damage to an object, in accordance with embodiments of the present invention. In embodiments, step 52 of determining at least one potential source of damage to an object includes step 52A of determining a potential source of damage to the object by analyzing historical trends. After determining the potential source of damage to the object in step 52A, step 52B may provide feedback to a service provider or customer of the potential source of the damage to the object, in accordance with embodiments. In embodiments, providing feedback to a service provider or customer may be in any form of communicating information, including electronic messaging, displays on consoles, printing of paper reports, or any other means of communication appreciated by one of ordinary skill in the art.

Figure 6:
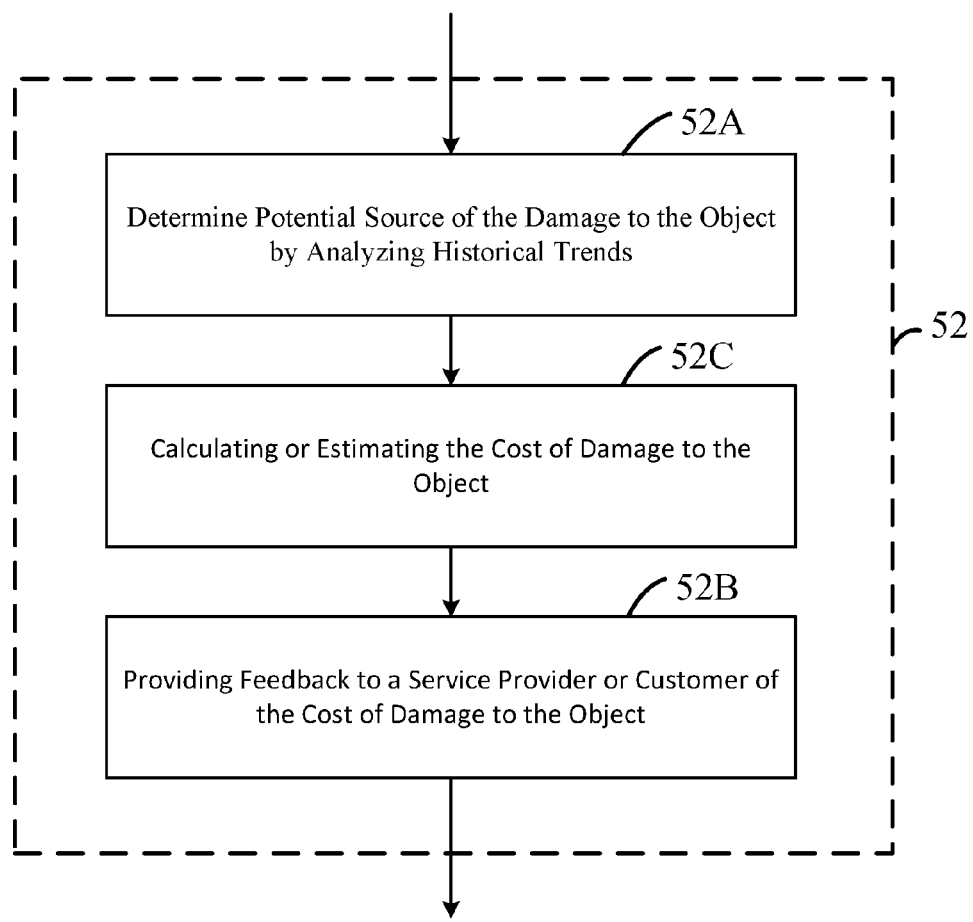
FIG. 6 is a process flow diagram of an example method that calculates or estimates the cost of damage to an object, in accordance with embodiments of the present invention.

FIG. 6 is a process flow diagram of an example method that calculates or estimates the cost of damage to an object, in accordance with embodiments of the present invention. Similar to FIG. 5, embodiments may include step 52A which determines a potential source of damage to an object by analyzing historical trends. In step 52C, a process may calculate or estimate the cost of damage to the object, in accordance with embodiments. Calculation or estimation of cost of damage may be correlated to industry standards, may be correlated to historical cost of damage to similarly damaged object, and/or may use any other methodology to calculate and/or estimate cost of damage to an object as would be appreciated by one of ordinary skill in the art. In step 52B, feedback may be provided to a service provider or customer including the calculated or estimated cost of damage to an object.

Figure 7:
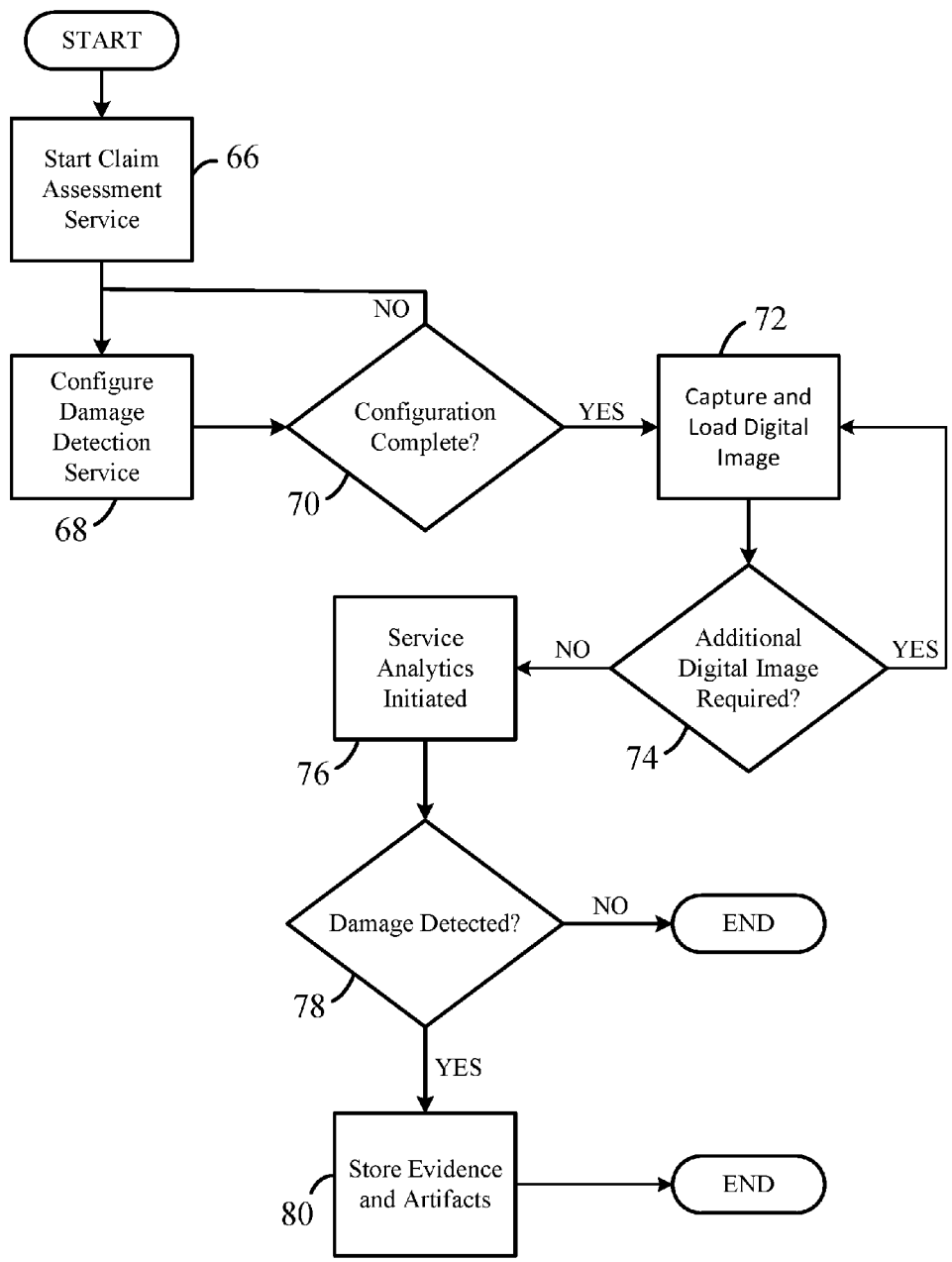
FIG. 7 illustrates a service configuration that assesses damage to objects, in accordance with embodiments of the present invention.

FIG. 7 illustrates a service configuration that assesses damage to objects, in accordance with embodiments of the present invention. In step 66, service may be initiated to capture digital images of good being transported and/or leased. In step 68, a damage detection service may be configured to support the corresponding goods that will be transported or leased. In step 68, wear and tear guidelines and/or thresholds may be programmed into a system. In embodiments, service may be integrated with other technologies utilized to uniquely identify and track items.

In step 70, it may be decided if service configurations are complete. For example, it may be checked that wear and tear guidelines are set or confirm that other settings that may be necessary have been configured. If the configurations are not complete as determined in step 70, then the process may proceed back to step 68 to configure or reconfigure damage detection settings. If the configurations are complete as determined in step 70, then the process may proceed to step 72.

In step 72, at least one digital image may be captured and loaded into a service when a package is received or prior to leasing a product to a customer. In embodiments, any digital images captured may be control points, which may be used to detect damages. In step 74, it is determined if any additional images will be taken during all phases of the transport when property is handled by a new carrier or provider. If additional images are required, then the process returns back to step 72 to capture and load digital images. For example, in the case of checked luggage on an airline, at least one first digital image is taken of checked luggage at the time of a customer checking in in step 72. While the luggage is in transport, the process remains pending in step 74, until it is confirmed that no additional digital images are required. Then, prior to a customer claiming their luggage at their destination, at least one second digital image may be taken in a repeated step 72, which then again proceeds to step 74. In between the checking of luggage and the claiming of luggage, capturing of additional digital images at any number of times while the luggage is in transit may be accomplished in the loop between step 72 and step 74. Once there are no more images required to be taken, such as upon claiming of the luggage, then step 74 will determine that there are no more images necessary for the forthcoming service analytics. One of ordinary skill in the art would appreciate similar requirements for other systems aside from luggage handling without departing from the spirit and scope of the embodiments of the present invention, such as checked luggage 24A illustrated in FIG. 1A, received package 28A illustrated in FIG. 1B, received vehicle 32A illustrated in FIG. 1C, received tool 36A illustrated in FIG. 1D, received clothing 40A illustrated in FIG. 1E, and/or any other object that may be assessed for damage in accordance with embodiments. In step 74, if additional images are not required, then the process may proceed to step 76.

In step 76, service analytics are initiated to assess the digital images taken when the property was received or leased based on criteria configuration standards against a final digital image. In step 78, it is determined if service analytics detected anomalies in the digital images, the service may identify which images reflect the damages, to determine when the property was damaged and by which handler. In step 78, if it is determined that the property was not damaged in step 78, then the process will end, as it is not necessary for there to be any reconciliation with the customer to compensate for the damage.

If it is determined that the property was damaged in step 78, then the service will take actions based on the process that was configured in step 68. For example, a visual inspection may be performed to determine if damages fall under normal wear and tear. In embodiments, the visual inspection may be performed by machine. In alternative embodiments, the visual inspection may be performed by a customer service representative associated with the service. If it is determined that property has been damaged in step 78, then the process may proceed to step 80. In step 80, a service may store evidence and artifacts for property or leased items based on the configuration duration. In embodiments, this stored evidence may be used by an operator of a service to efficiently resolve claims and/or prevent liability for false claims. Upon completion of step 80, a service may end.

Figure 8:
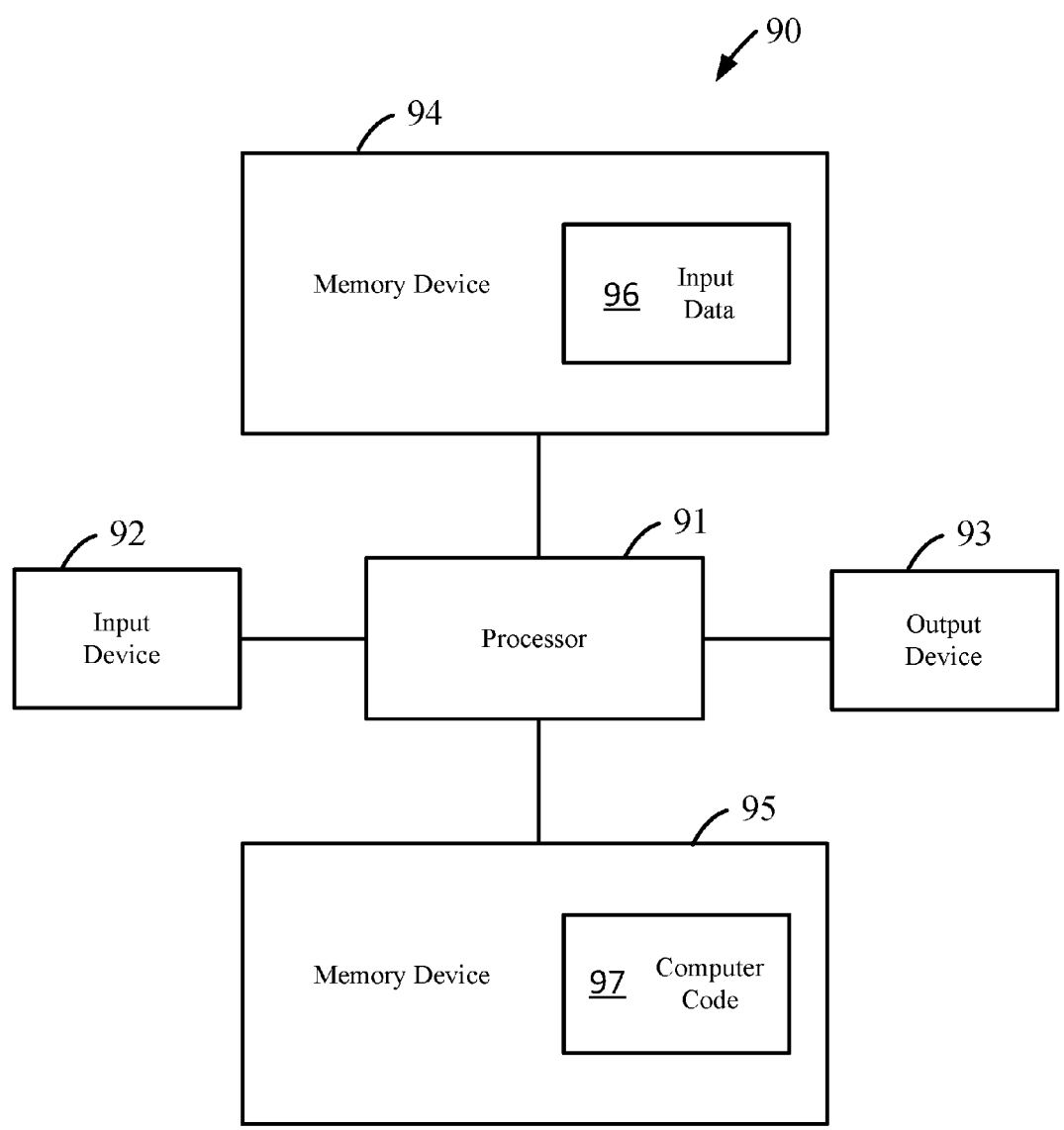
FIG. 8 illustrates a computer system used for implementing the methods associated with embodiments of the present invention.

FIG. 8 illustrates a computer system 90 used for implementing the methods of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that includes computer-executable instructions. The computer code 97 includes software or program instructions that may implement an algorithm for implementing methods of embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may be used as a computer usable storage medium (or program storage device) having a computer readable program embodied therein and/or having other data stored therein, wherein the computer readable program includes the computer code 97. Generally, a computer program product (or, alternatively, an article of manufacture) of the computer system 90 may include the computer usable storage medium (or said program storage device).

The processor 91 may represent one or more processors. The memory device 94 and/or the memory device 95 may represent one or more computer readable hardware storage devices and/or one or more memories.

Thus embodiments of the present invention discloses a process for supporting, deploying and/or integrating computer infrastructure, integrating, hosting, maintaining, and deploying computer-readable code into the computer system 90, wherein the code in combination with the computer system 90 is capable of implementing the methods of embodiments of the present invention.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of embodiments may include one or more computer readable hardware storage devices having computer readable program code stored therein, said program code containing instructions executable by one or more processors of a computing system (or computer system) to implement the methods of the present invention.

A computing system (or computer system) of embodiments may include one or more processors, one or more memories, and one or more computer readable hardware storage devices, said one or more hardware storage devices containing program code executable by the one or more processors via the one or more memories to implement the methods of embodiments.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of assessing damage to an object, comprising the steps of:
   taking a first digital image of the object at a first location and a first point in time with at least one first camera;
   taking a second digital image of the object at a second location and a second point in time with at least one second camera, wherein the second point in time is after the first point in time;
   comparing, by one or more processors, the first digital image and the second digital image and determining if there is damage to the object based on the comparison; and
   in response to a determination that there is damage to the object, then determining, by the one or more processors, at least one potential source of the damage to the object by analyzing historical trends of damage to historically damaged objects, wherein the determining at least one potential source of the damage to the object comprises:
   collecting information related to circumstances and locations of the object between the first point in time and the second point in time and between the first and second locations;
   comparing the information related to the circumstances and locations of the object to information related to stored circumstances and stored locations of the historically damaged objects, the historical trends being computed based on patterns attributed to similarities in information related to the stored circumstances and stored locations of the historically damaged objects; and
   determining the at least one potential source of the damage to the object based on similarities between the information related to circumstances and locations of the object and the information related to the stored circumstances and stored locations of the historically damaged objects,
   wherein the information related to stored circumstances and stored locations of the historically damaged objects includes a database of a plurality of different stored circumstances and a plurality of different stored locations, and wherein said plurality of different stored circumstances and different stored locations include specific circumstances and locations along a plurality of different paths between the first and second locations.

2. The method of claim 1, wherein the determining the at least one potential source of the damage to the object is performed by a service analytics engine to generate a trend report based on the circumstances of the object and the circumstances of the historically damaged objects.

3. The method of claim 2, wherein the service analytics engine generates the trend report using a special purpose algorithms implemented by at least one of hardware or software to determine the at least one potential source of damage from the circumstances of the object and the circumstances of the historically damaged objects, wherein the at least one hardware or software includes specialized, non-generic hardware and circuitry for executing only methods of determining the at least one potential source of damage.

4. The method of claim 3, wherein the special purpose algorithm determines the at least one potential source of damage based on at least one result of one or more comparisons selected from the group consisting of:
   a comparison of attributes of a scratch on the object and the historically damaged objects;
   a comparison of attributes of a tear on the object and the historically damaged objects;
   a comparison of attributes of a crack on the object and the historically damaged objects;
   a comparison of attributes of an indentation on the object and the historically damaged objects;
   a comparison of attributes of a missing component on the object and the historically damaged objects;
   a comparison of attributes of a discoloration on the object and the historically damaged objects;
   a comparison of attributes of a travel path of the object and the historically damaged objects;
   a comparison of a brand of the object and the historically damaged objects;
   a comparison of a model of the object and the historically damaged objects;
   a comparison of attributes of personnel handling the object and the historically damaged objects;
   a comparison of weight attributes of the object and the historically damaged objects;
   a comparison of circumstantial weather attributes of the object and the historically damaged objects;
   a comparison of utility attributes of the object and the historically damaged objects;
   a comparison of seasonal attributes of the object and the historically damaged objects; and
   combinations thereof.

5. The method of claim 1, wherein the determination that there is damage to the object is based on at least one predetermined damage threshold.

6. The method of claim 5, wherein the at least one predetermined damage threshold are associated with predefined normal wear and tear standards.

7. The method of claim 1, wherein the determining at least one potential source of the damage to the object comprises comparing at least one of the first digital image of the object or the second digital image of the object to digital images of the historically damaged objects.

8. The method of claim 1, comprising calculating a cost of damage to the object.

9. The method of claim 1, wherein the method is implemented by at least one transportation carrier, and the step of comparison includes a comparison of attributes of personnel handling the object and the historically damaged objects.

10. The method of claim 9, wherein the transportation carrier is selected from a group consisting of:
    an airplane operator;
    a train operator;
    a boat operator;
    a bus operator;
    a motor coach operator;
    a bicycle operator;
    an automobile operator;
    a trucking operator;
    a shipping company;
    a package handler; and
    combinations thereof.

11. The method of claim 9, wherein the at least one potential source of the damage to the object is selected from a group consisting of:
- a route of the object;
- equipment handling the object;
- personnel handling the object;
- a contractor of the transportation carrier; and
- combinations thereof.

12. The method of claim 9, wherein at least one of:
- the first point in time is during a check-in procedure of the transportation carrier; or
- the second point in time is during a final delivery procedure of the transportation carrier.

13. The method of claim 12, wherein the first digital image is provided to a customer during the check-in procedure of the transportation carrier.

14. The method of claim 1, wherein the comparing the first digital image and the second digital image is performed by a convolutional neural network algorithm.

15. The method of claim 1, wherein the object is a rented or leased item.

16. The method of claim 7, wherein the rented or leased item is selected from a group consisting of:
- a vehicle;
- an automobile;
- a boat;
- equipment;
- furniture;
- an appliance;
- a tool;
- clothing; and
- combinations thereof.

17. The method of claim 1, wherein at least one of the first digital image and the second digital image is at least one of:
- a digital image;
- a three dimensional image;
- a x-ray image; and
- combinations thereof.

18. A system that assesses damage to an object, comprising:
- at least one first camera configured to take a first digital image of the object at a first point in time;
- at least one second camera configured to take a second digital image of the object at a second point in time, wherein the second point in time is after the first point in time;
- a comparison unit configured to compare, by one or more processors, the first digital image and the second digital image to determine if damage is visible to the object based on the comparison; and
- an analytics engine configured to determine, by the one or more processors, at least one potential source of damage to the object by analyzing historical trends of damage to historically damaged objects, wherein the analytics engine determines said at least one potential source of the damage to the object by the steps of:
- collecting information related to circumstances and locations of the object between the first point in time and the second point in time and between the first and second locations;
- comparing the information related to the circumstances and locations of the object to information related to stored circumstances and stored locations of the historically damaged objects, the historical trends being computed based on patterns attributed to similarities in information related to the stored circumstances and stored locations of the historically damaged objects; and
- determining the at least one potential source of the damage to the object based on similarities between the information related to circumstances and locations of the object and the information related to the stored circumstances and stored locations of the historically damaged objects,
- wherein the information related to stored circumstances and stored locations of the historically damaged objects includes a database of a plurality of different stored circumstances and a plurality of different stored locations, and wherein said plurality of different stored circumstances and different stored locations include specific circumstances and locations along a plurality of different paths between the first and second locations.

19. A computer program product, comprising a computer readable hardware storage device having computer readable program code stored therein, said program code containing instructions executable by one or more processors of a computer system to implement a method of assessing damage to an object, said method comprising:
- receiving a first digital image of the object at a first point in time;
- receiving a second digital image of the object at a second point in time, wherein the second point in time is after the first point in time;
- comparing the first digital image and the second digital image and determining if damage is visible to the object based on the comparison; and
- in response to a determination that damage is visible to the object, then determining at least one potential source of the damage to the object by analyzing historical trends of damage to historically damaged objects, wherein the determining said at least one potential source of the damage to the object comprises:
- collecting information related to circumstances and locations of the object between the first point in time and the second point in time and between the first and second locations;
- comparing the information related to the circumstances and locations of the object to information related to stored circumstances and stored locations of the historically damaged objects, the historical trends being computed based on patterns attributed to similarities in information related to the stored circumstances and stored locations of the historically damaged objects; and
- determining the at least one potential source of the damage to the object based on similarities between the information related to circumstances and locations of the object and the information related to the stored circumstances and stored locations of the historically damaged objects,
- wherein the information related to stored circumstances and stored locations of the historically damaged objects includes a database of a plurality of different stored circumstances and a plurality of different stored locations, and wherein said plurality of different stored circumstances and different stored locations include specific circumstances and locations along a plurality of different paths between the first and second locations.

* * * * *